Oct. 28, 1924.

H. E. E. V. BLISS 1,513,530

STEERING GEAR

Filed Feb. 26, 1921

7 Sheets-Sheet 2

Oct. 28, 1924.  
H. E. E. V. BLISS  
STEERING GEAR  
Filed Feb. 26, 1921  
1,513,530  
7 Sheets-Sheet 4
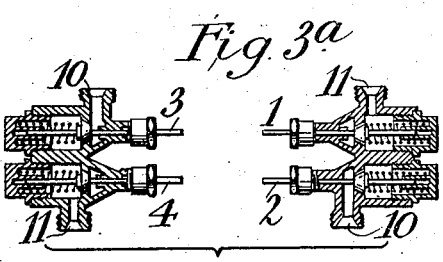
Fig. 3ª
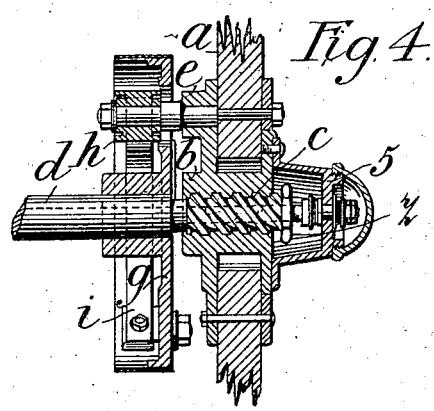
Fig. 4.
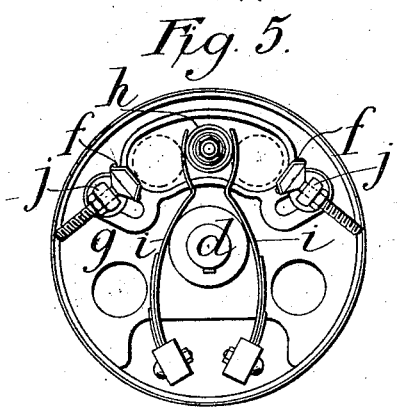
Fig. 5.

Oct. 28, 1924.

H. E. E. V. BLISS

STEERING GEAR

Filed Feb. 26, 1921

1,513,530

7 Sheets-Sheet 7

INVENTOR

Henry Edward Ernest Victor Bliss

By Julian C Dowell his attorney

Patented Oct. 28, 1924.

1,513,530

UNITED STATES PATENT OFFICE.

HENRY EDWARD ERNEST VICTOR BLISS, OF MARLOW, ENGLAND.

STEERING GEAR.

Application filed February 26, 1921. Serial No. 448,261.

(GRANTED UNDER THE PROVISIONS OF THE ACT OF MARCH 3, 1921, 41 STAT. L., 1313.)

*To all whom it may concern:*

Be it known that I, HENRY EDWARD ERNEST VICTOR BLISS, a subject of the King of Great Britain and Ireland, residing at Marlow, in the county of Bucks, England, have invented Improvements in Steering Gears (for which I have filed application in England Aug. 29, 1919, Number 21,290, Patent Number 165,855, accepted July 11, 1921), of which the following is a specification.

This invention has reference to that class of steering gear in which the rudder is adapted to be actuated either by hand alone, or when necessary, with the assistance of power, the application of which is controlled by the movements of the hand actuating device, and in particular to gear of the kind in which the steering wheel is connected to the steering shaft, which is geared to the rudder, through a lost motion device or spring drive and movements of the steering wheel relatively to said shaft in either direction are adapted to cause equivalent valve movements in order to control the motors for actuating mechanism between the steering shaft and the rudder in such manner that the motive fluid assists in moving the rudder in the required direction. The object of the present invention is to provide a simplified gear specially adapted to the steering of ships, an important feature being the employment of worm gearing between the steering wheel and motor operated mechanism so that ordinarily the power exerted by said motor operated mechanism cannot be transmitted back to the steering wheel and manual rotation of the latter although assisted by power is alone effective to alter the position of the rudder. A further feature consists in utilizing the spring drive to normally actuate the rudder and the provision of independently controlled means for supplying motive fluid to the valves of the motors at the will of the steersman only when he desires that his own exertions should be supplemented. The motive fluid used may be compressed air, which is preferred, or hydraulic pressure and, in either case, hydraulic cup leathers are fitted to the piston or pistons so as to offer but little resistance when the pistons move idly under the influence of the hand actuated device alone.

Figure 1:
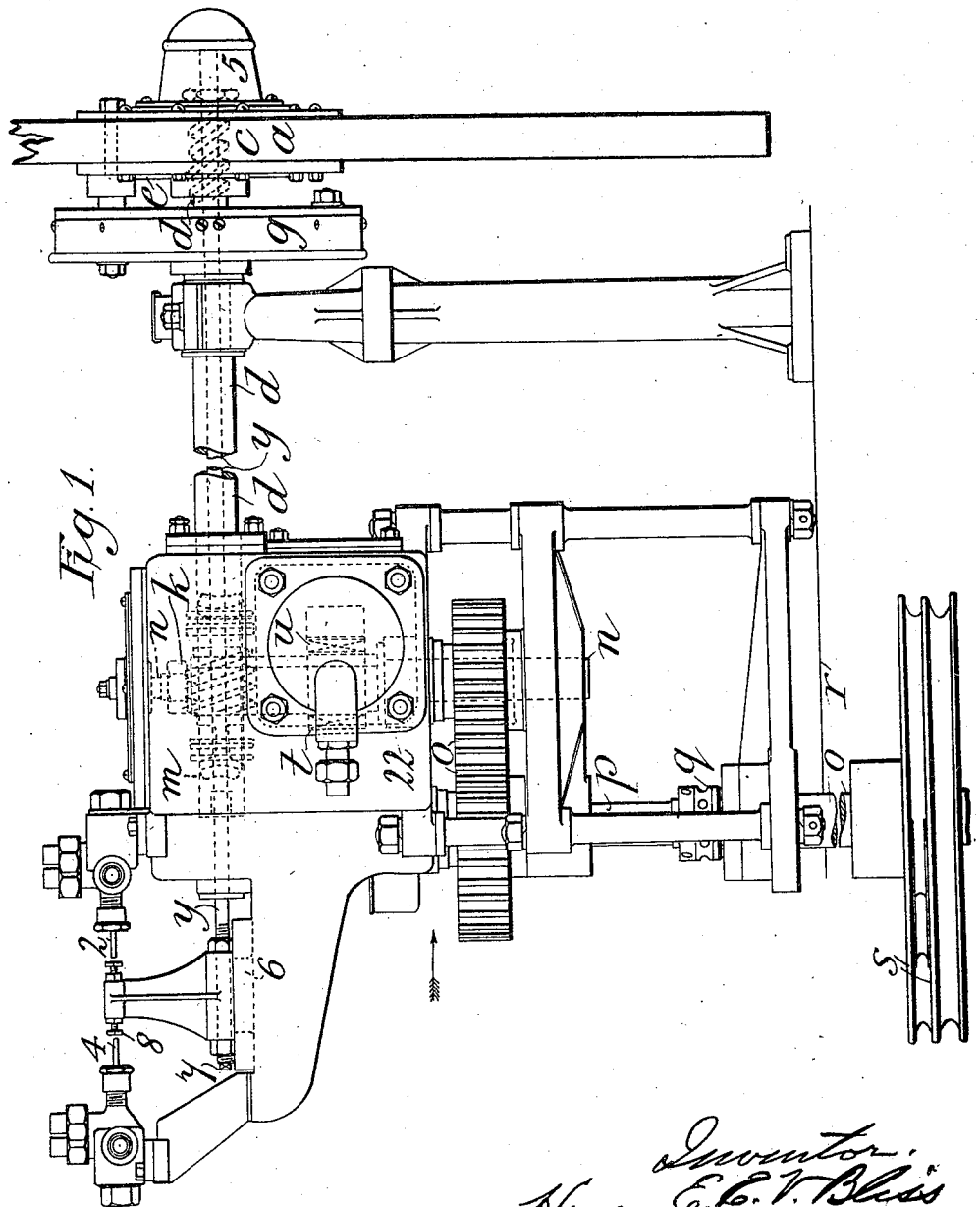
Figure 2:
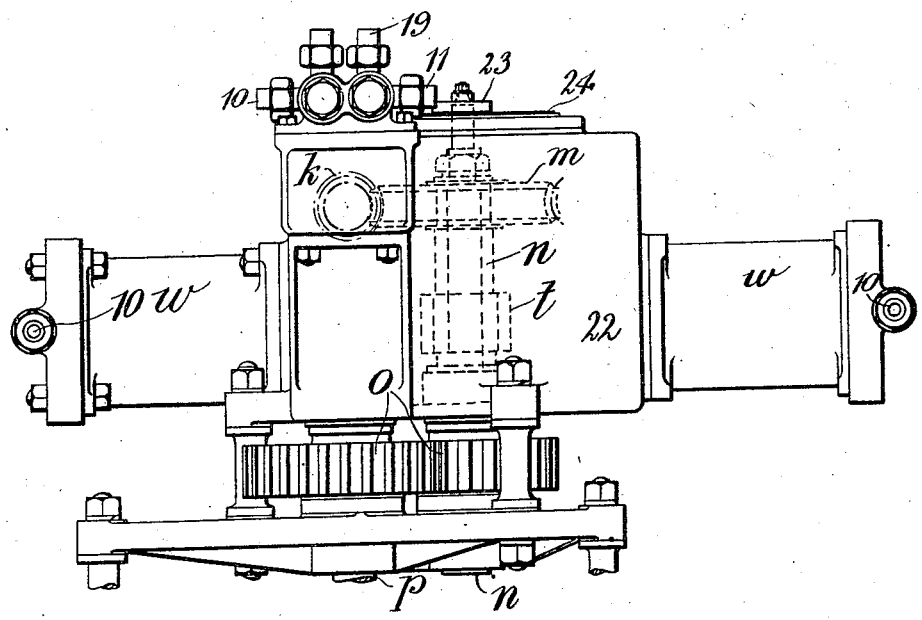
Figure 3:
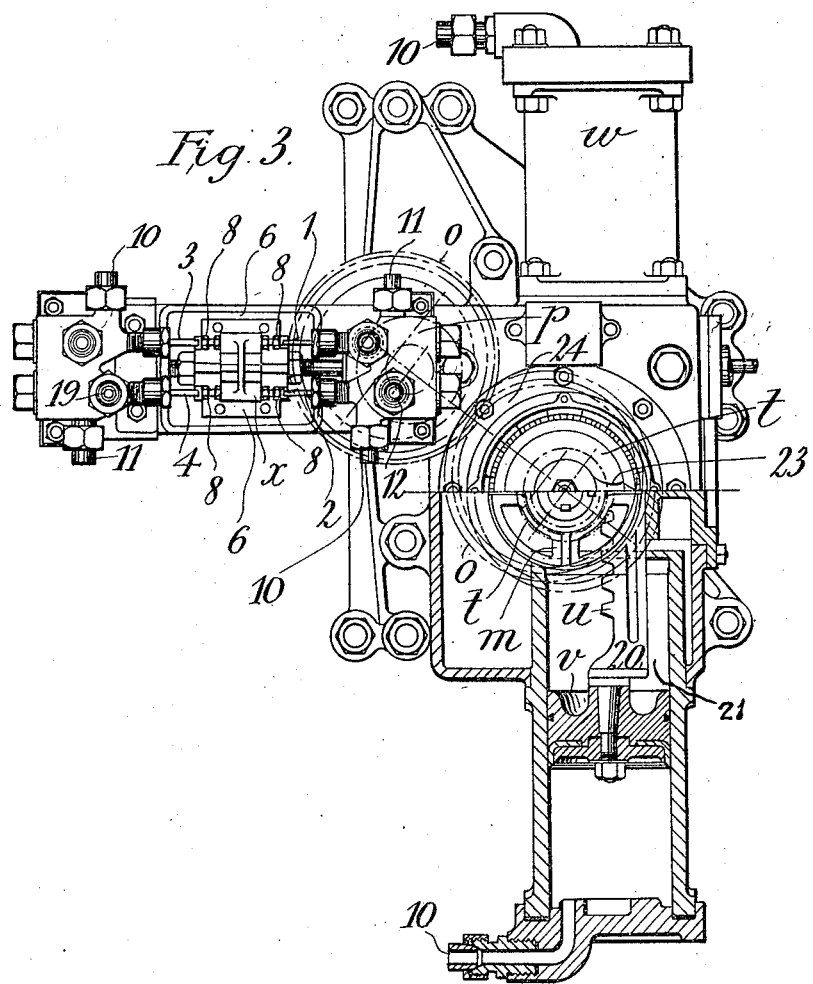
Figure 6:
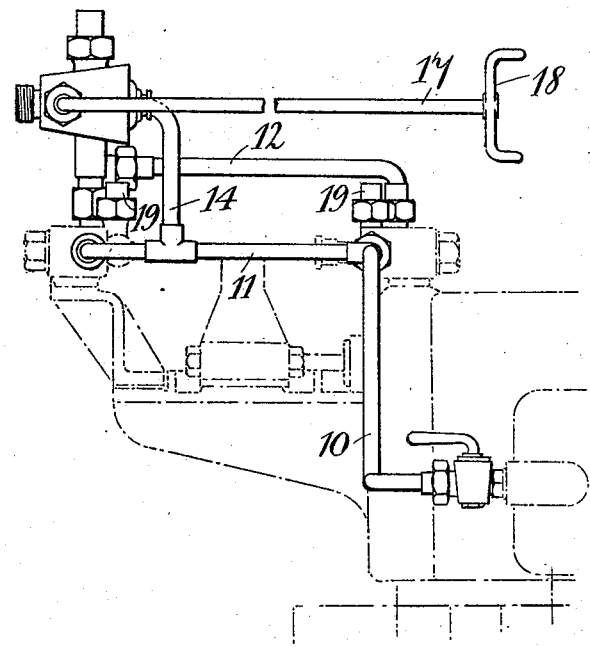
Figure 7:
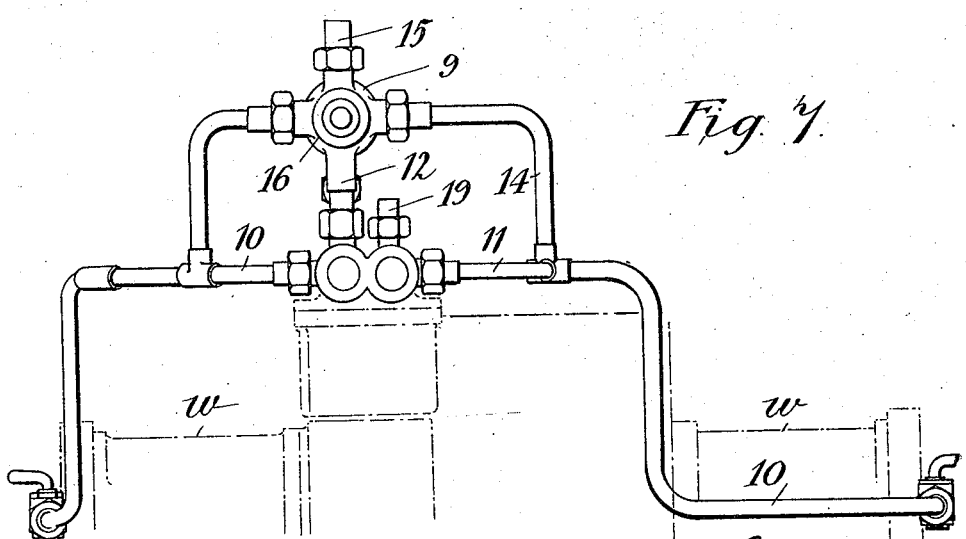
Figure 8:
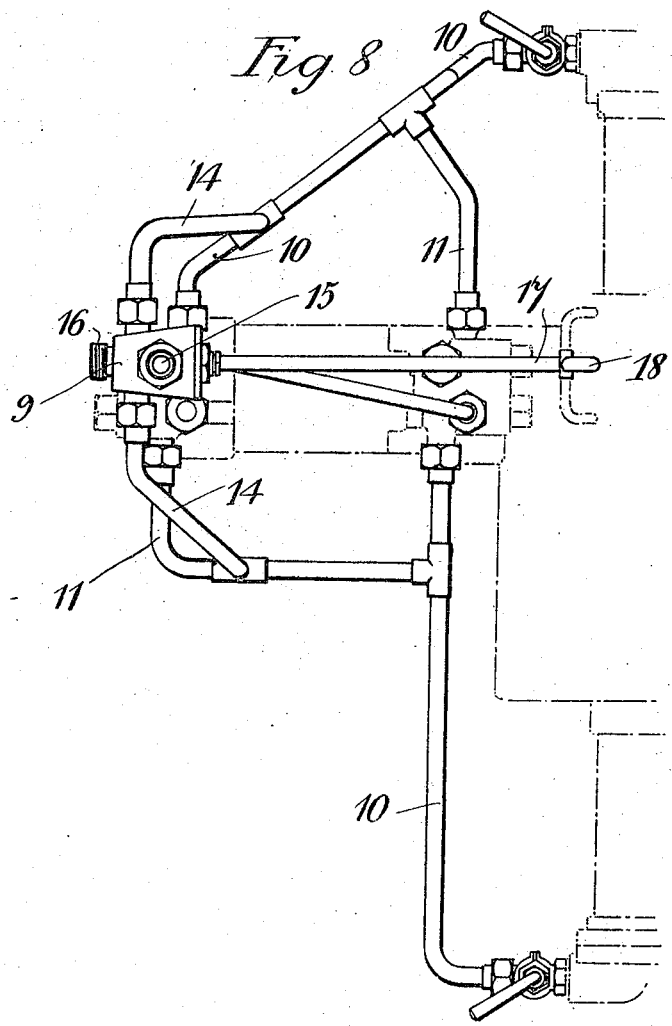
Figure 9:
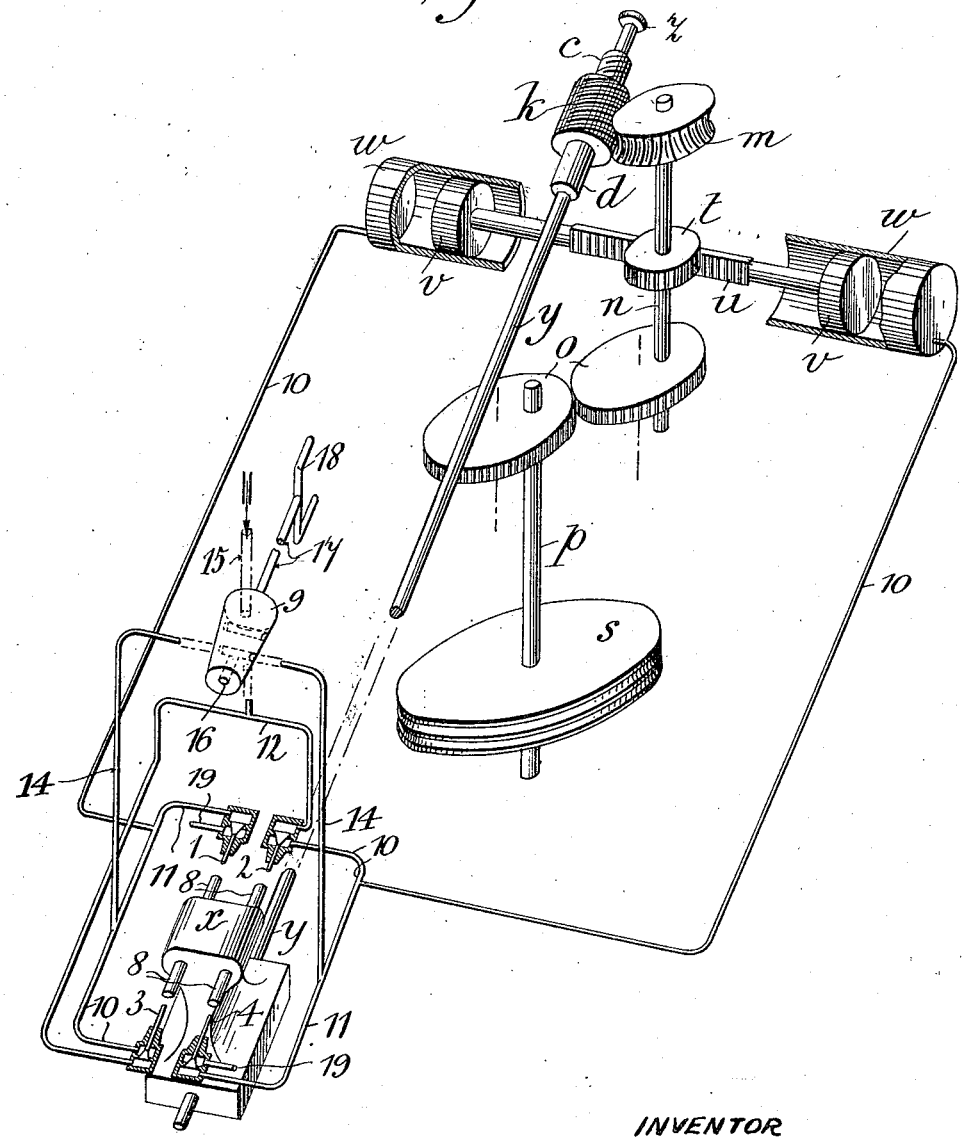

One arrangement is illustrated by way of example in the accompanying drawings of which Fig. 1 is a side elevation. Fig. 2 is an elevation looking in the direction of the arrow in Fig. 1 and Fig. 3 is a plan of a portion of Fig. 1 with parts in section. Fig. 3ª is a part of Fig. 3 in section showing valve details. Fig. 4 is a sectional elevation of a portion of Fig. 1 and Fig. 5 is an elevation of Fig. 4. Figs. 6, 7 and 8 are views corresponding to Figs. 1, 2 and 3 respectively showing the pipe connections associated therewith. Fig. 9 is a perspective view diagrammatically showing the arrangement of parts.

In this arrangement, referring more particularly to Figs. 4 and 5, the steering wheel $a$ is formed with a threaded hub $b$ that fits upon a threaded part $c$ of the steering shaft $d$ and with a crank arm $e$ that extends between leather-faced stops $f$ on a disc $g$ keyed upon the said shaft $d$, the crank arm preferably being provided with a roller $h$ and lying between leaf springs $i$ carried by the disc $g$ and serving as a spring drive until so far stressed as to abut against one or other of the stops $f$. The stops $f$ are adjustable as regards angle and distance so that by causing them to both engage the springs $i$ and thus grip the roller $h$ the steering wheel $a$ can be locked to its shaft $d$ as may be desired when the steering is to be by hand only or in the event of a spring breaking; the stops $f$ may be in the form of screws extending through blocks $j$ which are movable towards and from the centre of the disc in radial slots and are suitably fixed in the adjusted positions.

The steering shaft $d$ as shown in Figs. 1 and 2 is also provided with a worm $k$ driving a worm wheel $m$ on a vertical shaft $n$ that is geared, through spur wheels $o$ to a second vertical shaft $p$ (for brevity referred to in the claims as the rudder shaft), which may be supported by ball bearings $q$ and carries below or above the deck $r$ a twin grooved wheel $s$ around which pass the steering wires or chains; the shaft $p$ makes only half a rotation and the gears $o$ are preferably of the eccentric toothed type so as to provide for decreasing speed and increasing power as the rudder is put hard over by rotation of the steering wheel $a$ and shaft $d$. The worm wheel shaft $n$ also carries a toothed wheel $t$ engaged by a rack $u$ connecting a pair of pistons $v$ working in opposed cylinders w, the distribution of compressed air to which is controlled by spring pressed mushroom valves shown in Fig. 3ª arranged side by side in pairs in casings together generically referred to as 1, 2 and 3, 4, each pair comprising the admission valve of one cylinder and the exhaust valve of the other cylinder, the spindles of the two pairs which are spaced apart extending towards each other, as clearly seen in Figs. 1 and 3, at opposite sides of an arm x attached to a rod y that passes through the steering shaft d and is connected so as to move axially but not in a rotary sense with the steering wheel a as it is turned about the threaded portion c of said shaft; the said connection comprising the collar arrangement z cooperating with the cap 5 shown in Fig. 4 as attached to the steering wheel a. The valve actuating arm x, which works in a guide 6 is adjustable on the rod y as by being mounted on a threaded part of the rod which can be screwed through the arm, the end 7 of the rod y being squared to facilitate such adjustment. The arm x is also provided with adjustable screw or like abutments 8 for the valve spindles for the purpose of timing the valves. Compressed air is admitted to the distributing valves through a main cock 9, see Figs. 6, 7, 8 and 9, which cuts off the cylinders w from the atmosphere when air is turned on and opens them to atmosphere when air is cut off.

A pipe 10 leads from each admission valve casing 2, 3 to the corresponding cylinder w and from each such pipe a branch 11 leads to the corresponding exhaust valve casing 1, 4; the main cock 9 may be in the form of a plug cock with two sets of ports one regulating the supply of air to the admission valve, that is to say directly to the casing 3 and through pipe 12 to casing 2, and the other set controlling communication between branches 14 from each of the pipe systems 10, 11 and the atmosphere, 15 being the inlet to the cock and 16 a nipple to which a "breather" may be applied. A quarter turn of the cock cuts off the air and opens the cylinders to atmosphere or vice versa, the cock being shown as provided with a spindle 17 having a handle 18 which in the full line position corresponds to cock closed. 19 are cylinder exhaust pipes.

Assuming that the steersman requires assistance for greater manoeuvring power it is merely necessary to turn on this cock 9, whereupon on the steersman turning the steering wheel a in either direction it will partially rotate idly upon the threaded portion c of the steering shaft although travelling axially to a slight extent therealong and thus cause the valve-actuating rod to move in a corresponding direction; the movement of the rod y first opens the exhaust valve, say 1, of the cylinder w to the left of Fig. 2 and upper side of Fig. 3 and then the corresponding inlet valve 2 of the other cylinder w thus admitting compressed air to the latter by way of pipes 12 and 10 and transmitting power through the piston-connecting rack u to the pinion t on the first mentioned vertical shaft n and tending to move the rudder through the gearing o as in the case of hand power. The worm k on the steering shaft d in connection with the worm wheel m on the vertical shaft n prevents the helm going hard over with a rush as air is admitted to one of the cylinders w, and, if the rudder is to be put over, the steering wheel a must continue to be turned by hand at the desired speed. Even if the power transmitted through the rack u were sufficient to overcome the friction of the worm k and worm wheel m and turn the steering shaft d and its disc g these would overrun the steering wheel a and cause the latter to move axially and effect a reverse movement of the valve actuating rod y which would result in the other pair of exhaust and inlet valves being opened and the opposing cylinder coming into action.

It will be understood that the leaf springs i can be adapted to make it necessary that a helmsman shall exert any desired amount of pull upon the spokes of the steering wheel before relative movement between the steering wheel a and the steering shaft d takes place and consequently before air is admitted to either cylinder.

About a quarter of an inch stroke of the valve actuating rod will be sufficient to produce the desired lift of the control valves.

The air will be locked in the respective cylinders w at any part of the piston stroke as soon as the steering wheel a returns to its neutral position upon the shaft d and will assist in absorbing shocks that might be produced by the rudder, which in addition to the friction offered by the worm k and worm wheel m makes the gear almost self holding.

The piston travel may be arrested by blocks 20 at the back of the rack u coming into contact with the ends of the rack guide 21.

A box 22 may be provided for the gear with a division and a slight well in the bottom, the mouths of the cylinders w being formed as shown in Fig. 3 so that lubricant and leakage air can flow to another box, not shown, designed to silence the exhaust from the outlets 19 and to catch lubricant, said box being fitted with a drain cock and check valves.

A helm pointer 23 for the purpose of showing the position of the rudder can be provided on the upper end of the worm wheel shaft n that protrudes through a suitable cover 24.

What I claim is:—

1. In a steering gear embodying a rudder shaft, with hand and motor operated mechanism therefor, the combination with valve means controlling the motor operated mechanism of a hollow worm shaft forming part of the hand operated gearing and having a screwthreaded portion at one end, means adapted to hold said shaft against longitudinal movement, a shaft within the worm shaft, having at the end remote to the screwthreaded end of the worm shaft, means adapted to operate the valve means aforesaid, a hand wheel having a screwthreaded hub capable of rotary and axial motion in relation to the worm shaft, means connecting the valve operating shaft to the hand wheel so that it follows the axial movement of the latter, and resilient means between the hand wheel and worm shaft adapted to resist rotary movement of the hand wheel in relation to the worm shaft and consequent operation of the valve means until after a predetermined effort is manually transmitted to the rudder shaft.

2. In a steering gear embodying a rudder shaft, with hand and motor operated mechanism therefor, the combination with valve means controlling the motor operated mechanism of a hollow worm shaft forming part of the hand operated gearing and having a screwthreaded portion at one end, means adapted to hold said shaft against longitudinal movement, a shaft within the worm shaft, having at the end remote from the screwthreaded end of the worm shaft means adapted to operate the valve means aforesaid, a hand wheel having a screwthreaded hub capable of rotary and axial motion in relation to the worm shaft, means connecting the valve operating shaft to the hand wheel so that it follows the axial movement of the latter, a disc upon the worm shaft provided with a pair of leaf springs, a crank upon the hand wheel provided with a roller in contact with both leaf springs whereby rotary movement of the hand wheel in relation to the worm shaft and consequent operation of the valve means is resisted until after a predetermined effort is manually transmitted to the rudder shaft.

3. In a steering gear embodying a rudder shaft, with hand and motor operated mechanism therefor, the combination with valve means controlling the motor operated mechanism, of a hollow worm shaft forming part of the hand operated gearing, and having a screwthreaded portion at one end, means adapted to hold said shaft against longitudinal movement, a shaft within the worm shaft, having at the end remote from the screwthreaded end of the worm shaft means adapted to operate the valve means aforesaid, a hand wheel having a screwthreaded hub capable of rotary and axial motion in relation to the worm shaft, means connecting the valve operating shaft to the hand wheel so that it follows the axial movement of the latter, resilient means between the hand wheel and worm shaft adapted to resist rotary movement of the hand wheel relative to the worm shaft and consequent operation of the valve means until after a predetermined effort is manually transmitted to the rudder shaft, and adjustable means adapted to eliminate the resilience of the connecting means aforesaid.

4. In a steering gear embodying a rudder shaft, with hand and motor operated mechanism therefor, the combination with valve means controlling the motor operated mechanism of a hollow worm shaft forming part of the hand operated gearing and having a screwthreaded portion at one end, means adapted to hold said shaft against longitudinal movement, a shaft within the worm shaft, having at the end remote from the screwthreaded end of the worm shaft means adapted to operate the valve means aforesaid, a hand wheel having a screwthreaded hub capable of rotary and axial motion in relation to the worm shaft, means connecting the valve operating shaft to the hand wheel so that it follows the axial movement of the latter, a disc upon the worm shaft provided with a pair of leaf springs, a crank upon the hand wheel provided with a roller in contact with both leaf springs whereby rotary movement of the hand wheel in relation to the worm shaft and consequent operation of the valve means is resisted until after a predetermined effort is manually transmitted to the rudder shaft, and adjustable stops upon the disc adapted to be moved into contact with both springs and render the drive positive.

Signed at Nassau, in the Bahama Islands, this twenty-first day of February, 1921.

HENRY EDWARD ERNEST VICTOR BLISS.